(12) United States Patent
Cleary, Jr. et al.

(10) Patent No.: US 6,977,653 B1
(45) Date of Patent: Dec. 20, 2005

(54) SURROUND SOUND DISPLAY

(75) Inventors: Edward J. Cleary, Jr., Beaverton, OR (US); Steven A. Kronschnabel, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/520,927

(22) Filed: Mar. 8, 2000

(51) Int. Cl.$^7$ .......................... G06T 11/20; H04R 29/00; H04R 5/02
(52) U.S. Cl. .......................... 345/440; 381/56; 381/306
(58) Field of Search .......................... 381/12, 58, 306, 381/307, 56, 1, 17, 18, 61, 63; 345/440, 14, 345/716; 324/14 R; 73/696, 645, 655, 657; 700/94

(56) References Cited

U.S. PATENT DOCUMENTS

| | | | |
|---|---|---|---|
| 4,027,107 A * | 5/1977 | Eilers | 381/5 |
| 4,081,829 A * | 3/1978 | Brown | 381/56 |
| 4,528,501 A * | 7/1985 | Dorrough et al. | 345/978 |
| 4,691,358 A * | 9/1987 | Bradford | 324/121 R |
| 4,768,086 A * | 8/1988 | Paist | 340/815.46 |
| 4,933,768 A * | 6/1990 | Ishikawa et al. | 345/978 |
| 5,212,733 A * | 5/1993 | DeVitt et al. | 345/14 |
| 5,272,756 A * | 12/1993 | Tanaka et al. | 381/1 |
| 5,412,731 A * | 5/1995 | Desper | 381/1 |
| 5,579,396 A * | 11/1996 | Iida et al. | 324/121 R |
| 5,619,220 A * | 4/1997 | Tomita et al. | 345/14 |
| 5,666,424 A * | 9/1997 | Fosgate et al. | 381/104 |
| 5,671,287 A * | 9/1997 | Gerzon | 381/17 |
| 5,751,819 A * | 5/1998 | Dorrough | 324/121 R |
| 5,809,150 A * | 9/1998 | Eberbach | 381/300 |
| 5,812,688 A * | 9/1998 | Gibson | 345/978 |
| 5,870,484 A * | 2/1999 | Greenberger | 381/12 |
| 5,995,706 A * | 11/1999 | Iijima et al. | 340/815.46 |
| 6,021,204 A * | 2/2000 | Eastty | 381/12 |
| 6,154,549 A * | 11/2000 | Arnold et al. | 381/12 |
| 6,363,155 B1 * | 3/2002 | Horbach | 345/14 |
| 6,532,024 B1 * | 3/2003 | Everett et al. | 345/716 |

FOREIGN PATENT DOCUMENTS

| | | |
|---|---|---|
| JP | 56020344 | 2/1981 |
| JP | 56064600 | 6/1981 |

OTHER PUBLICATIONS

Surround Audio Monitor 5836A (Leader) For Multi-Channel Audio Signals (3-1, 3-2 types) Digital Input/Analog Input Features.

Master Stereo Display—Short Form Catalogue, The MSD600-Series, Multichannel PPM, CDR-1616 Digital Audio Matrix.

* cited by examiner

*Primary Examiner*—Ryan Yang
(74) *Attorney, Agent, or Firm*—Francis I. Gray

(57) ABSTRACT

A surround sound display has a graphic sound stage image, including speakers representing sources and a central listener, and bent correlation meter scales for each stereo channel. The correlation meter scales have values from +1 at one end to −1 at the other end and are bent to start from a central point along one side of the display between the speakers representing the stereo channels to a point along the opposing adjacent sides of the display outside the respective speakers. A marker, either in the form of individual pointers for each scale or as a fill area that spans the scales, indicates the correlation between the stereo channels. The thickness of the fill area indicates the amplitudes of the stereo channels. Where a central sound source is part of the surround sound system, the marker may be in the form of truncated wedges, the wedge for the central sound source having a fixed width and the widths of the wedges for the stereo channels being variable so that the widths indicate the correlation between the stereo channels. The heights of the wedges toward a central listener in the display indicate the amplitudes for each of the sound channels of the surround sound system.

15 Claims, 4 Drawing Sheets

SURROUND SOUND DISPLAY

BACKGROUND OF THE INVENTION

The current invention relates to displays of audio information, and more particularly to a surround sound display for displaying certain characteristics, such as amplitude and phase relationships, of multi-channel sound.

Correlation between two signals is a measure of how much alike the two signals are, expressed mathematically. If both signals are identical except for amplitude scaling, the correlation is positive and unity. If the signals are completely unrelated, the correlation is zero. A negative unity indicates that the signals are identical except for amplitude scaling, but of opposite polarity. Therefore the correlation between two signals may have any value between +1 and −1.

There have been attempts to give a visual indication of multi-channel sound characteristics. The Master Stereo Display MSD-600 with a CDR-1616 Digital Audio Matrix provides separate graphic and bar graph displays of multi-channel sound. Also the Leader 5836A Surround Audio Monitor displays a sound image of multi-channel sound for 3-1/3-2 types of surround audio systems. The MSD multi-channel "jellyfish" display has no phase information, just relative amplitude between channels. The Leader multi-channel Lissajous—like display is useful, but very difficult to interpret —it does not give an easy to understand representation of the sound field.

What is desired is a surround sound display that gives a user a quick visual representation of a surround sound audio program in a single display for both amplitude and phase elements.

BRIEF SUMMARY OF THE INVENTION

Accordingly the present invention provides a surround sound display that gives a user a quick simple display of the phase and amplitude characteristics of a surround sound system. The display includes a sound stage image, using speaker images or symbols at appropriate locations on the display and a listener image in the center of the display. For each channel of a stereo pair a bent correlation meter scale, either visible or invisible, is used with a +1 correlation at one end of the scale situated at the center, a zero correlation in the middle of the scale at the corner, and a −1 correlation at the other end of the scale situated around the corner at approximately ninety degrees with respect to the listener image. Corresponding markers for the bent correlation meter scales are used to represent the amount of correlation between the channels of the stereo pair, the distance or "width" between the markers representing the correlation between the stereo channels. Brightness or color may be used as an indication of amplitude of each channel of the surround sound system, or wedges that extend toward the listener image may be used where the "height" of the wedges represents amplitude and the angular "width" represents phase.

The objects, advantages and other novel features of the present invention are apparent from the following detailed description when read in conjunction with the appended claims and attached drawing.

DETAILED DESCRIPTION OF THE INVENTION

Figure 1:
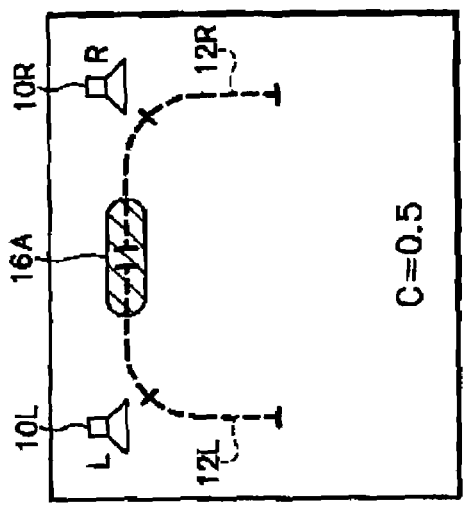
FIG. 1 is a graphic view display for a simple stereo system according to the present invention.

Referring now to FIG. 1 a two-channel stereo system display is shown with Left and Right channels only. A "bent" correlation meter scale 12L, 12R is associated with each channel in front of a speaker image 10L, 10R for each channel at the upper corners of the display. Image "width" as represented by the distance between a pair of pointers 14L, 14R, one for each correlation meter scale, is related to phase correlation between the channels. Fully correlated L and R channels produce a point image in the center of the "sound stage" represented by the speaker images 10L, 10R, sometimes called a phantom center. As L and R correlation decreases, the distance between the markers 14L, 14R widens until at zero correlation the pattern is as wide as the space between the speaker images. As correlation goes negative, the pattern or distance between the pointers 14L, 14R extends outward around the "bend" beyond the speaker images 10L, 10R.

Figure 2A:
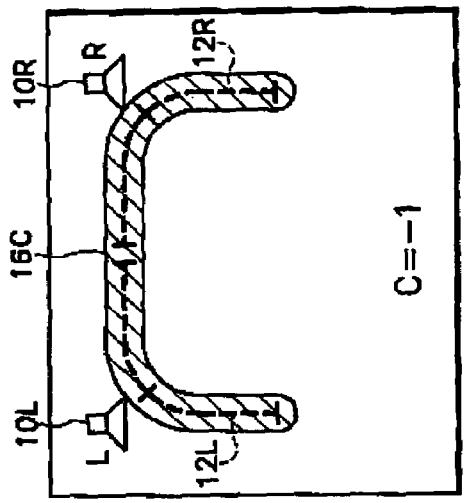
FIGS. 2A, 2B and 2C represent an alternative graphic view display for different correlation values for the simple stereo system according to the present invention.
Figure 2B:
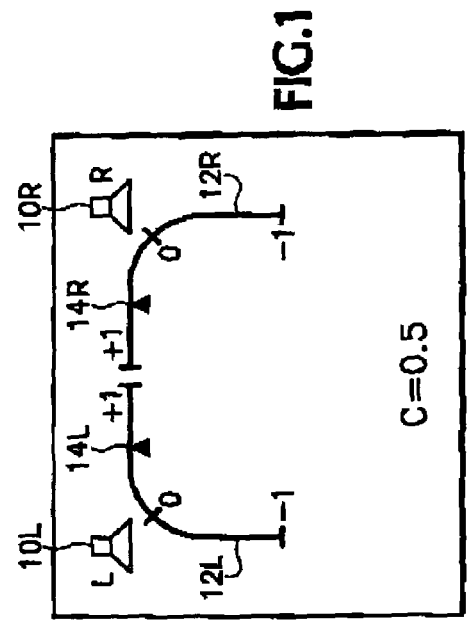
Figure 2C:
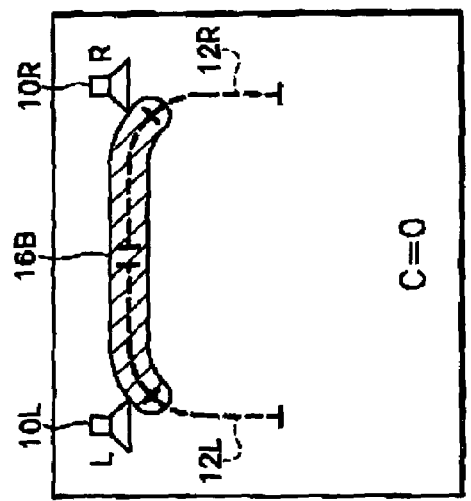
Figure 3:
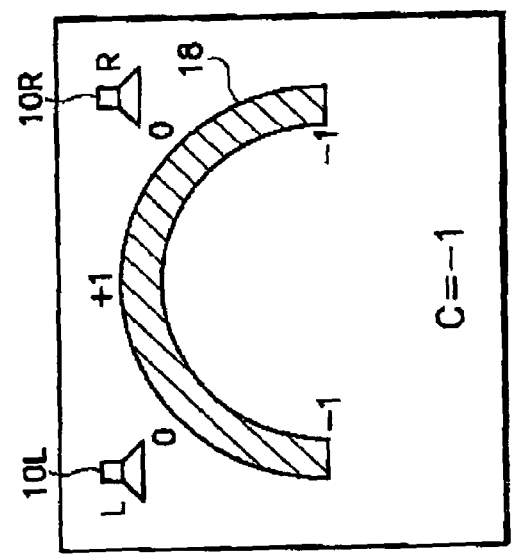
FIG. 3 is a graphic view display for the simple stereo system using an annular ring pattern according to the present invention.
Figure 4:
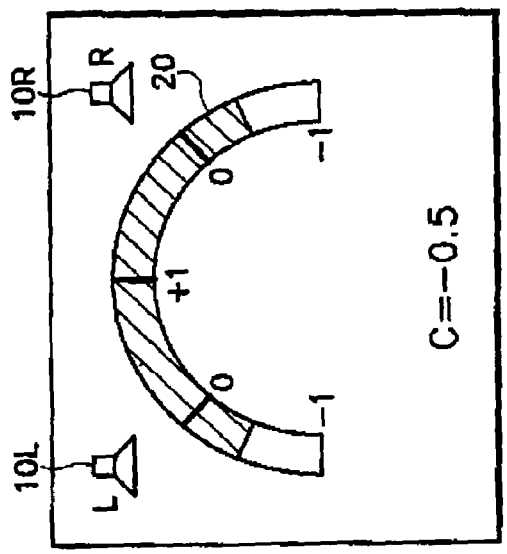
FIG. 4 is a graphic view display for the simple stereo system using a ring angle pattern according to the present invention.
Figure 5:
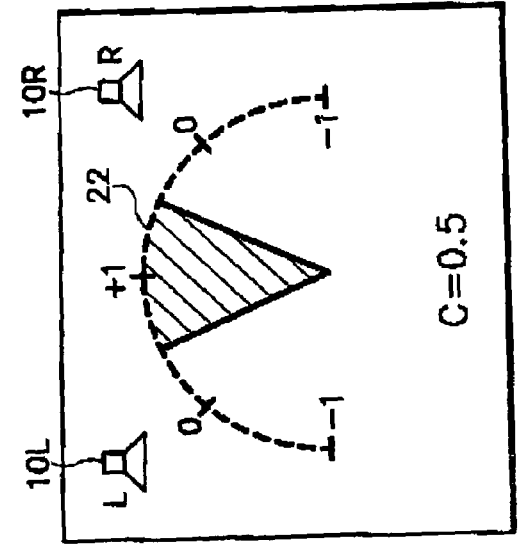
FIG. 5 is a graphic view display for the simple stereo system using a pie slice pattern according to the present invention.
Figure 6:
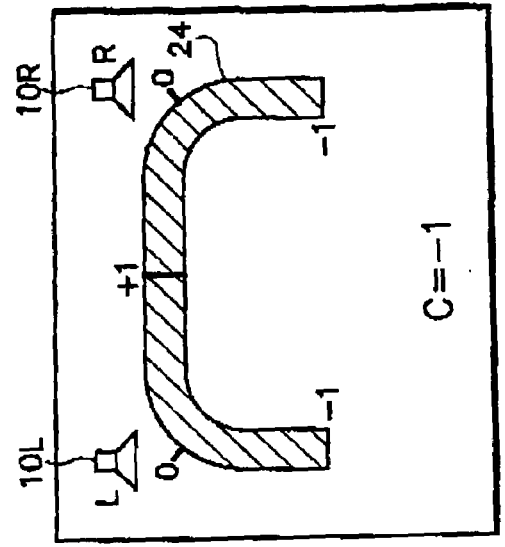
FIG. 6 is a graphic view display for the simple stereo system using a rectangular pattern according to the present invention.

Instead of the bent correlation meter scales 12L, 12R, the space between the pointers 14L, 14R may be filled in with bright or colored areas, as indicated in FIGS. 2A, 2B and 2C for correlation values of 0.5, 0 and −1. Also the pattern may be filled or shaped differently as shown in FIGS. 3–6 representing respectively (a) an annular ring pattern 18 for a correlation value of −1, (b) a ring angle pattern 20 proportional to correlation for a correlation value of −0.5, (c) a pie slice pattern 22 for a correlation value of +0.3, and (d) a rectangular ring pattern 24 for a correlation value of −1.

Figure 7:
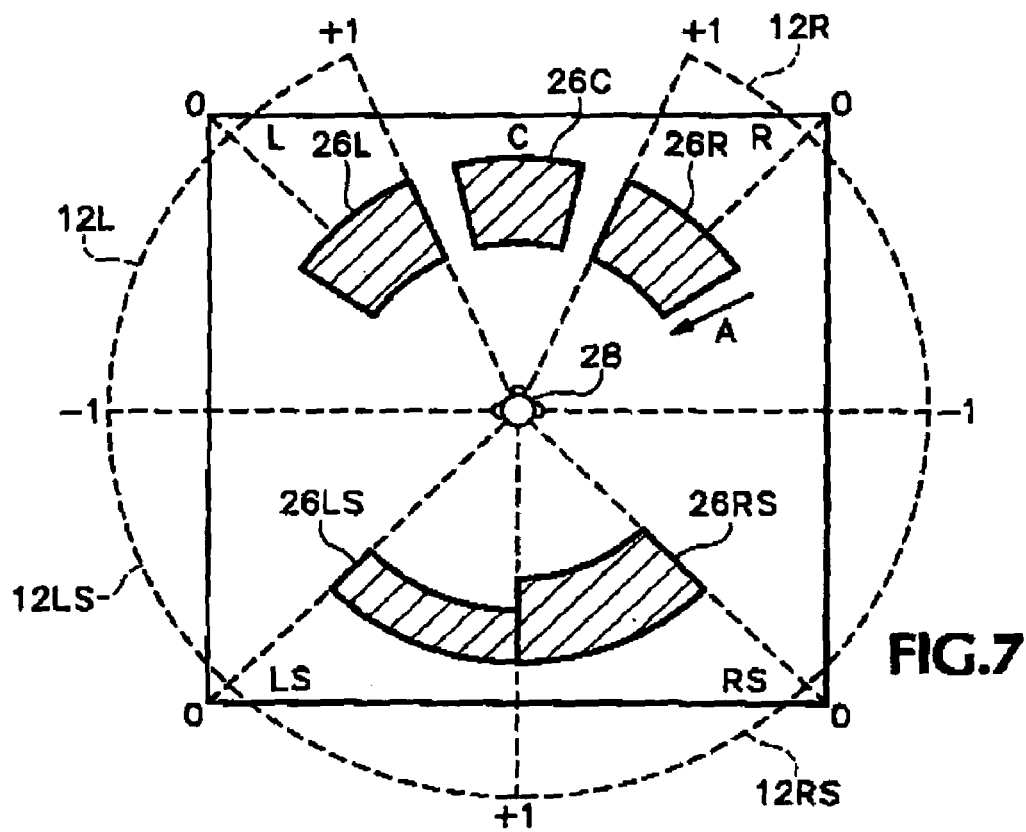
FIG. 7 is a graphic view display for a five channel surround sound system according to the present invention.

In addition to phase correlation the pattern may indicate intensity or level as well either by means of brightness or color of "wedges" 26L, 26R, 26C, 26LS, 26RS associated with each channel, or by turning the wedges into amplitude meters deflecting inward toward a "listener" 28 represented by a head image at the center of the display, as shown in FIG. 7 for a 5-channel system. The C (Center) channel wedge 26C is fixed in location and width. Amplitude A is indicated by change in height toward the listener 28 in the center. The inner sides of the L and R wedges 26L, 26R are fixed, but the outer sides move along an invisible or visible phase correlation meter scale 12L, 12R to indicate correlation from +1 to −1 as shown. The amplitudes of the L and R signals are indicated by the heights of the wedges moving towards the listener. The wedges are essentially level bars whose width depends on phase correlation between the signals and whose height depends on the amplitudes of the individual signals. The same scheme is used for the Left Surround and Right Surround channels at the bottom of the display.

Figure 8:
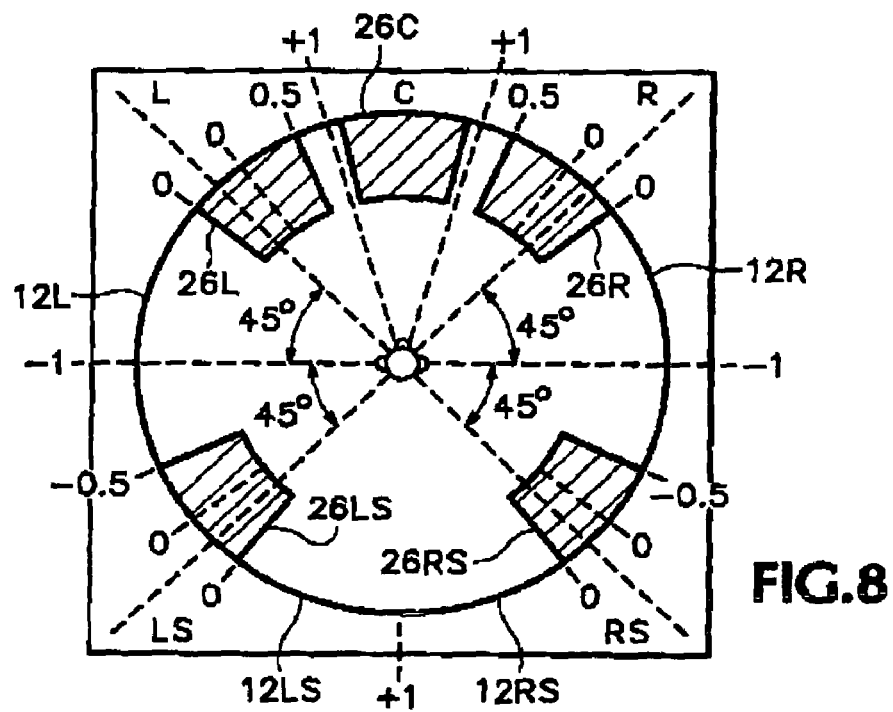
FIG. 8 is an alternative graphic view display for the five channel surround sound system according to the present invention.

A variation of this scheme is shown in FIG. 8 where the zero correlation condition is indicated by wedges 26L, 26R centered on left and right 45° axes. When correlation is positive, the wedges widen along the correlation meter scales 12L, 12R towards the center wedge 26C while the opposite edge remains fixed. When correlation is negative, the edge away from the center wedge moves outward, widening the wedges toward the 90° axes while the edge toward the center remains fixed. In all cases the amplitude is indicated by the height of the wedge toward the listener. The same scheme is used for the Surround channels at the bottom of the display.

Figure 9:
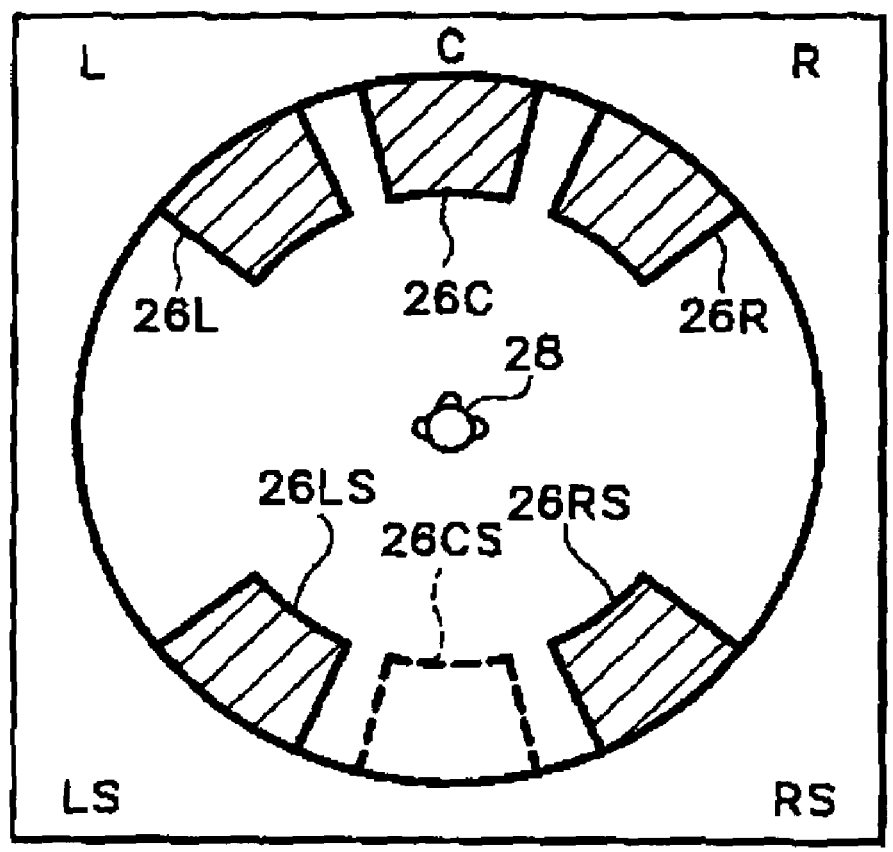
FIG. 9 is a further alternative graphic view display for the five channel surround sound system according to the present invention.

Another variation of this display, shown in FIG. 9, eliminates phase information altogether, showing only the amplitude relationships between channels. This pattern keeps the wedges at a fixed width, and the amplitude of each channel is shown by expanding the wedge height toward the listener at the center. This is essentially a circular bar graph. Optionally a wedge 26CS for a "Low Frequency Enhancement" sixth channel, for 5.1 channel sound, may be added at the center rear between the Surround channel wedges 26LS, 26RS.

These displays shown in FIGS. 1–9 give a user a quick visual representation of a surround sound audio program. The displays of FIGS. 7 and 8 offer in a single display both amplitude and phase elements critical to proper system monitoring. Phase reversals, radical unbalance or missing channels are immediately evident. Properly interpreted these displays also provide a visual image of the sound field. Such displays supplement, but do not replace, conventional bar graphs and Lissajous patterns that are still needed for detailed analysis or accurate measurements.

The data for the display is obtained by digitizing the audio from each channel, performing a correlation function between the audio channels of a stereo pair to obtain a correlation value, converting the correlation values to a graphic display according to the desired display function from among FIGS. 1–9, adding the graphic images to the graphic display, and periodically displaying the graphic display on a suitable display device. The graphic display may be updated sixty times a second to provide an instantaneous display of the surround sound audio program. Peak values may be displayed as well, such as by using an arc segment at the inner ends of the wedges. The display is created from the amplitude of each channel, which is straightforward, and the computed correlation between the L & R and LS & RS channels. One correlation computation that may be used is the same as that used in the 764 Digital Audio Monitor manufactured by Tektronix, Inc. of Beaverton, Oreg. as described in the accompanying User Manual. The amplitude data is processed in the same way as for a level meter, i.e., metering ballistics are applied. The correlation data also may be smoothed.

The present invention may be extended to any number of systems having different channels, such as the common 3/1 system (three front channels L, C, R and one surround channel S) simply by fixing the width of the rear wedges and using them both to represent the S channel. They might even be joined to become one wide wedge. The extensions may be from simple stereo systems to 7.1 channel systems.

Thus the present invention provides on a single display a representation of a surround sound field showing amplitude information for each channel and phase correlation between channel pairs by presenting a "sound stage" with speaker images and a listener, providing a correlation meter scale, either visible or invisible, for each channel of stereo channels, and providing markers that have an amplitude toward the listener representative of amplitude and a width representative of correlation or phase.

What is claimed is:

1. A surround sound display representing a plurality of sound channels comprising:
    a two-dimensional surround sound stage image;
    a curvilinear correlation meter scale for each sound channel of the surround sound stage image that has a corresponding sound channel to form a stereo sound source; and
    markers related to the correlation meter scales that represent the correlation between the corresponding sound channels.

2. The display as recited in claim 1 wherein the surround sound stage image comprises speaker images positioned at appropriate positions of the display to represent sound sources.

3. The display as recited in claims 1 or 2 wherein the surround sound stage image comprises a listener image positioned in the center of the display.

4. The display as recited in claim 1 wherein the correlation meter scale comprises a bent scale for each corresponding sound channel representing correlation values between +1 and −1 at opposing ends of the bent scale.

5. The display as recited in claim 4 wherein the bent scale has the +1 end centrally located along a first side of the display, the −1 end centrally located along a second side of the display, the second side being orthogonal to the first side, and a central portion representing a correlation value of 0 adjacent a corner between the first and second sides.

6. The display as recited in claim 4 wherein a second bent scale representing a related stereo sound source has the +1 end centrally located along the first side of the display adjacent the first bent scale, the −1 end centrally located along a third side of the display opposite the second side, and a central portion representing a correlation value of 0 adjacent a corner between the first and third sides.

7. The display as recited in claim 1 wherein the markers comprise a pointer for each sound channel, the location of the pointer along the correlation meter scale indicating the correlation between the corresponding sound channels.

8. The display as recited in claim 7 wherein the markers comprise a fill area spanning the correlation meter scales for the corresponding sound channels, the width of the fill area indicating the correlation between the corresponding sound channels.

9. The display as recited in claim 8 wherein the thickness of the fill area indicates the amplitude of each sound channel.

10. The display as recited in claim 1 wherein the correlation meter scales for the corresponding sound channels comprise bent scales each having a +1 value adjacent the other centrally along a first side of the display, respective −1 values centrally along opposing adjacent sides orthogonal to the first side, and 0 values adjacent respective corners between the first and each adjacent side.

11. The display as recited in claim 10 wherein the markers comprise a fill area that spans the correlation meter scales and has a width and a thickness, the width indicating the correlation between the corresponding sound channels.

12. The display as recited in claim 11 wherein the fill area has two contiguous portions, a first portion overlaying one of the correlation meter scales and a second portion overlaying the other one of the correlation meter scales, the thickness of the portions indicating the amplitude of each sound channel.

13. The display as recited in claim 1 wherein the markers comprise a plurality of truncated wedges, at least one of the truncated wedges having a fixed width representing a central audio source and the other truncated wedges representing the corresponding sound channels with a variable width, the variable width indicating the correlation between the corresponding sound channels.

14. The display as recited in claim 13 wherein the truncated wedges representing the corresponding sound channels have a first radial edge fixed at a +1 value for each corresponding sound channel and a second radial edge variable between the +1 value and a −1 value to alter the variable width of the truncated wedges to indicate the correlation between the corresponding sound channels.

15. The display as recited in claim 13 wherein the truncated wedges for the corresponding sound channels have a minimum width centered at a specified angle representing a 0 value of the correlation meter scales, and a first radial edge is fixed when the correlation is negative while a second radial edge varies to change the variable width of the truncated wedge and the second radial edge is fixed when the correlation is positive while the first radial edge varies to change the variable width of the truncated wedge.

* * * * *